Figure 1:
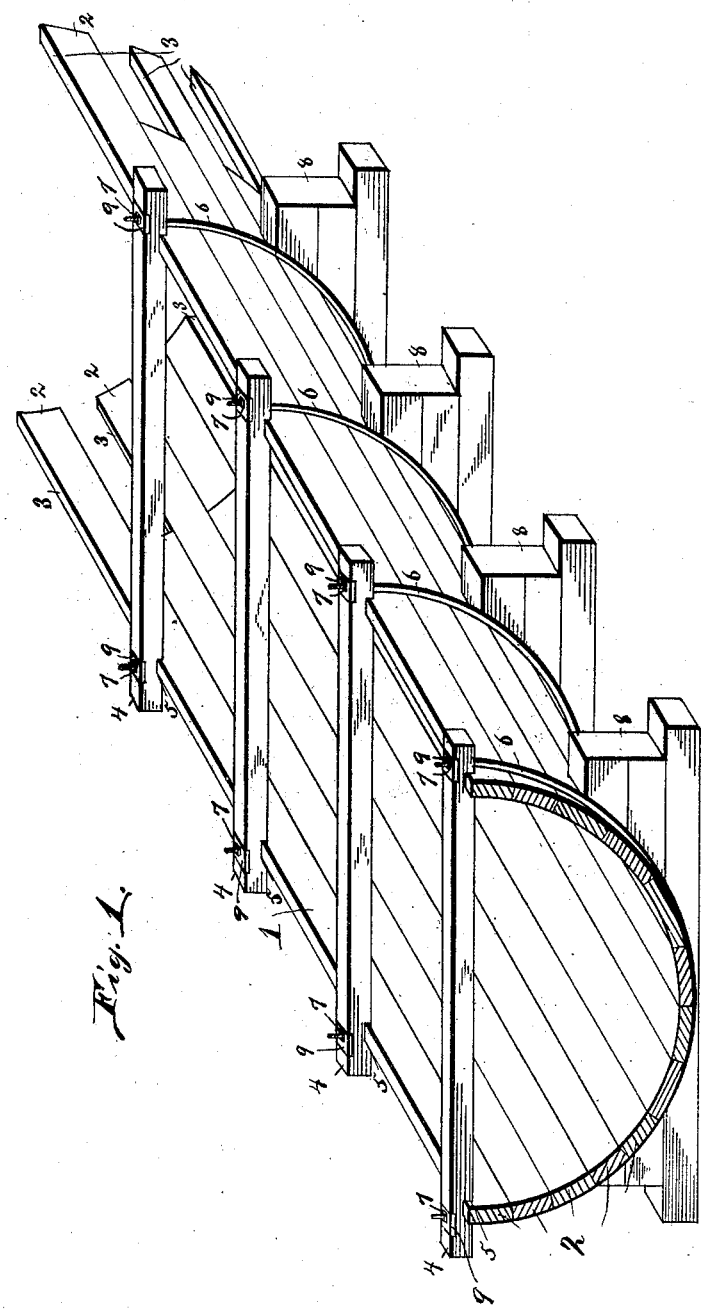

(No Model.) 2 Sheets—Sheet 1.

G. STERLING.
CONDUIT.

No. 502,474. Patented Aug. 1, 1893.

Witnesses
Eric G. Julihn
G. F. Thyer

Inventor
Guy Sterling
By Hopkins & Atkins
Attorneys (No Model.) 2 Sheets—Sheet 2.
G. STERLING.
CONDUIT.
No. 502,474. Patented Aug. 1, 1893.
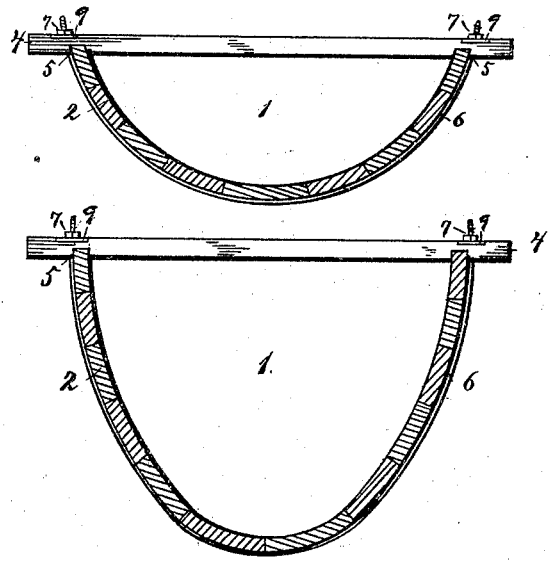
Fig. 2.
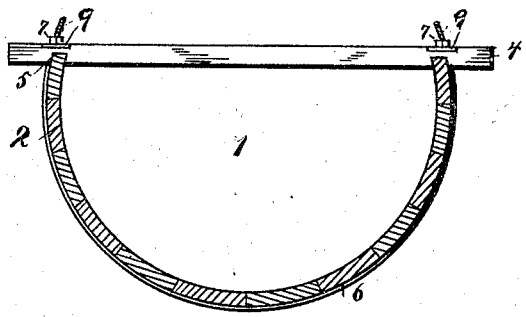
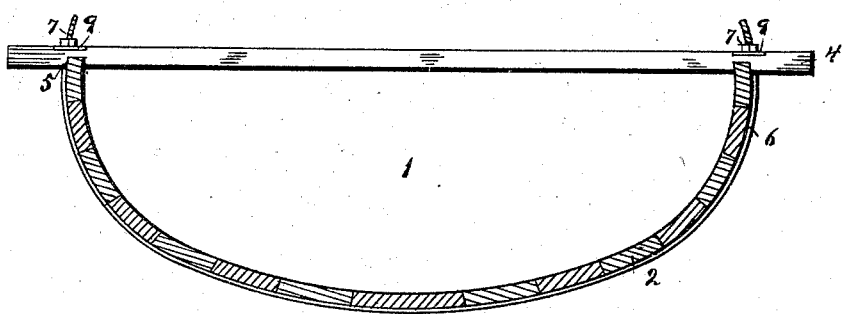
Witnesses
Eric G. Julihn
G. T. Myers
Inventor
Guy Sterling.
By Hopkins & Atkins
Attorneys

UNITED STATES PATENT OFFICE.

GUY STERLING, OF NORTH YAKIMA, WASHINGTON.

CONDUIT.

SPECIFICATION forming part of Letters Patent No. 502,474, dated August 1, 1893.

Application filed August 25, 1892. Serial No. 444,146. (No model.)

*To all whom it may concern:*

Be it known that I, GUY STERLING, of North Yakima, county of Yakima, State of Washington, have invented certain new and useful Improvements in Conduits, of which the following is a specification, reference being had to the accompanying drawings.

The object of my invention is to produce an improved knock-down flume or conduit for carrying water for irrigation, manufacturing, or other purposes, and consists in certain arrangements and combinations of parts by which the cost of manufacturing, and the time and labor necessary for setting up, may be materially diminished.

In the accompanying drawings, I have illustrated in Figure 1, in perspective a section of semi-cylindrical conduit. Fig. 2 includes several modified forms of conduit.

Referring to the figures on the drawings, 1, indicates a partially round conduit composed of longitudinal staves or pieces 2 having suitably beveled or correlated edges 3.

4 indicates tie-beams, which are made to span the top of the conduit and are provided with notches or recesses 5 adapted to receive the upper edges of the top staves.

6 indicates a band, or hoop, preferably made of iron or steel, provided on its opposite ends with screw-threads and nuts 7 by which it may be at each end passed through suitable openings in the tie-beam and screwed up to draw the parts together and form a solid half round open topped flume or conduit. Underneath the nuts, iron plates 9 are provided to afford rigid bearings for the nuts.

My flume may be carried in any suitable manner, as for example, by wooden sills 8.

I am aware that knock-down cylindrical wooden conduits are old, but being entirely closed they are objectionable for many uses, and I lay no claim thereto.

What I claim is—

1. The combination with an open top, round sided conduit, of a tie beam, and a hoop, screw threaded at its ends and adapted to be secured by nuts to the tie beam, substantially as and for the purpose specified.

2. The combination with the open top, round sided conduit, composed of separate staves, of a tie beam spanning the top thereof, and a hoop adapted to be secured upon the end of the tie beam for the purpose of uniting the staves together, and means for securing the ends of the hoops, substantially as and for the purpose specified.

In testimony of all which I have hereunto subscribed my name.

GUY STERLING.

Witnesses:
M. A. CHAPMAN,
B. N. COE.